(12) United States Patent
Suzuki et al.

(10) Patent No.: US 11,785,898 B2
(45) Date of Patent: Oct. 17, 2023

(54) ELECTRIC WORKING MACHINE

(71) Applicant: Makita Corporation, Anjo (JP)

(72) Inventors: Daisuke Suzuki, Anjo (JP); Kouichi Takeda, Anjo (JP)

(73) Assignee: MAKITA CORPORATION, Anjo (JP)

( * ) Notice: Subject to any disclaimer, the term of this patent is extended or adjusted under 35 U.S.C. 154(b) by 117 days.

(21) Appl. No.: 17/470,138

(22) Filed: Sep. 9, 2021

(65) Prior Publication Data

US 2022/0071109 A1    Mar. 10, 2022

(30) Foreign Application Priority Data

Sep. 10, 2020 (JP) ................................. 2020-152367

(51) Int. Cl.
*A01G 20/47* (2018.01)
*A47L 5/14* (2006.01)
*A47L 9/28* (2006.01)
*A47L 9/32* (2006.01)

(52) U.S. Cl.
CPC ............... *A01G 20/47* (2018.02); *A47L 5/14* (2013.01); *A47L 9/2842* (2013.01); *A47L 9/2857* (2013.01); *A47L 9/322* (2013.01)

(58) Field of Classification Search
CPC .................. A47L 5/14; A01G 20/47
See application file for complete search history.

(56) References Cited

U.S. PATENT DOCUMENTS

2015/0231779 A1*  8/2015  Kaupp ...................... B25F 5/02
                                                        173/170
2018/0146628 A1*  5/2018  Huo ........................ A47L 9/2857

FOREIGN PATENT DOCUMENTS

EP          2 910 339 A1     8/2015

* cited by examiner

*Primary Examiner* — Andrew A Horton
(74) *Attorney, Agent, or Firm* — Sughrue Mion, PLLC

(57) ABSTRACT

An electric working machine may include a control device configured to control an electric unit, an operation member, a first switch configured to be operated by the operation member, and a second switch configured to be operated by the operation member. The operation member may pass a second position and a third position while the operation member moves to the first position. The first switch may be configured to transmit a first signal which changes as the operation member moves from the second position to the first position to the control device when the operation member moves between the second position and the first position. The second switch may be configured to transmit a second signal to the control device when the operation member passes the third position. The control device may be configured to control the electric unit based on the first signal and the second signal.

9 Claims, 11 Drawing Sheets

ELECTRIC WORKING MACHINE

CROSS-REFERENCE TO RELATED APPLICATION

This application claims priority to Japanese Patent Application No. 2020-152367 filed on Sep. 10, 2020, the entire contents of which are hereby incorporated by reference into the present application.

TECHNICAL FIELD

This disclosure herewith relates to an electric working machine.

BACKGROUND

European Patent Application Publication No. 2910339 describes an electric working machine. The electric working machine comprises an electric unit, a control device for controlling the electric unit, an operation member which is operated by a user and movable to a first position, and a switch which is operated by the operation member while the operation member moves to the first position. The operation member passes a switching position while the operation member moves to the first position. When the operation member moves to the switching position, the switch transmits, to the control device, a first signal which changes as the operation member moves to the switching position, and transmits a second signal when the operation member has passed the switching position. The control device controls a rotation speed of the electric unit based on the first signal and the second signal.

SUMMARY

In the above configuration, a single switch transmits different types of signals to the control device depending on the position of the operation member. A switching position of such a switch may tend to vary due to manufacturing variations, thus a timing at which the switch stops transmission of the first signal to the control device and starts transmission of the second signal tends to vary from one electric working machine to another. This causes variations in performance of electric working machines. The present disclosure discloses a technique to reduce variations in performance of electric working machines.

The present disclosure discloses an electric working machine. The electric working machine comprises: an electric unit; a control device configured to control the electric unit; an operation member configured to be operated by a user and configured to be movable to a first position; a first switch configured to be operated by the operation member while the operation member moves to the first position; and a second switch configured to be operated by the operation member while the operation member moves to the first position. The operation member passes a second position and a third position while the operation member moves to the first position. The first switch is configured to transmit a first signal which changes as the operation member moves from the second position to the first position to the control device when the operation member moves between the second position and the first position. The second switch is configured to transmit a second signal to the control device when the operation member moves toward the first position and passes the third position. The control device is configured to control the electric unit based on the first signal and the second signal.

In the above configuration, the first switch transmits the first signal to the control device, and the second switch transmits the second signal to the control device. That is, neither of the switches changes a type of the signal it sends depending on the position of the operation member. With such a configuration, it is possible to use reliable components which have been generally used as the first switch and the second switch, thereby the second position for the first switch and the third position for the second switch tend not to vary due to manufacturing variations. Therefore, variations in timings at which the first switch starts transmitting the first signal and variations in timings at which the second switch starts transmitting the second signal can be reduced. Consequently, variations in performance of electric working machines can be reduced.

DETAILED DESCRIPTION

Figure 1:
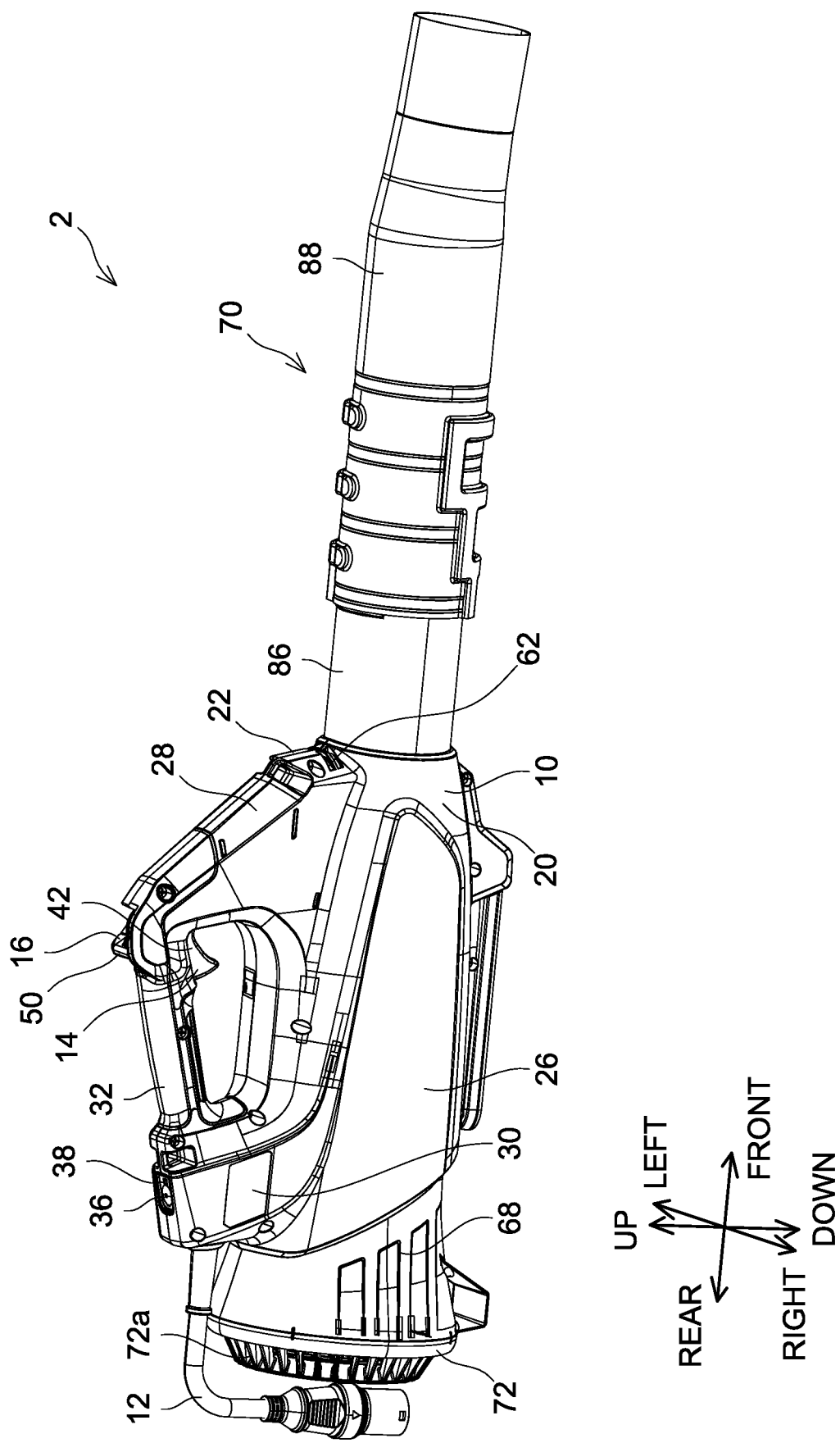
FIG. 1 is a perspective view of an electric working machine 2 of a first embodiment, viewed from the rear right side.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in conjunction with other features and teachings to provide improved electric working machines, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, the third position may be located closer to the first position than the second position.

In the above configuration, when the operation member moves between the second position and the third position, only the first signal is transmitted to the control device, while the second signal is not transmitted to the control device. By moving the operation member between the second position and the third position, the user can operate the electric unit by the control by the control device based on the first signal.

In one or more embodiments, the control device may be configured to control the electric unit based on the second signal when both of the first signal and the second signal are transmitted to the control device.

In the above configuration, when the operation member moves between the second position and the third position, the control device controls the electric unit based on the first signal, while controls the electric unit based on the second signal when the operation member passes the third position. By adjusting the position of the operation member, the user can selectively use the operation of the electric unit based on the first signal and the operation of the electric unit based on the second signal.

In one or more embodiments, the electric unit may include an electric motor. The electric working machine may further comprise: a fan configured to be driven by the electric motor; and an ejection nozzle configured to allow air forced by the fan to flow inside the ejection nozzle.

The above-mentioned electric working machine functions as a blower. In the above configuration, by virtue of the control device controlling the electric motor based on the first signal and the second signal, a flow rate of the air to be flown out of the ejection nozzle can be adjusted based on the respective signals.

In one or more embodiments, the control device may be configured to: perform control for increasing a rotation speed of the electric motor based on the first signal as the operation member moves from the second position to the first position; and perform control for changing the rotation speed of the electric motor to a first rotation speed based on the second signal.

In the above configuration, the control device controls the rotation speed of the electric motor based on the first signal and the second signal. By adjusting the position of the operating member, the user can adjust the rotation speed of the electric motor to a desired rotational speed, by which the flow rate of the air to be flown out of the ejection nozzle can be adjusted to a desirable rate.

In one or more embodiments, the first rotation speed may be higher than a maximum rotation speed of the electric motor when the control device controls the electric motor based on the first signal.

In the above configuration, when the control device controls the electric motor based on the second signal, it is possible to reach a rotation speed exceeding the range of the rotation speed of the electric motor controlled by the control device based on the first signal. Thereby, the convenience of the user can be enhanced.

In one or more embodiments, the operation member may include a trigger configured to be pressed by the user.

In the above configuration, the user can control the operation of the electric working machine with a simple operation.

In one or more embodiments, the electric working machine may further comprise a bias member configured to bias the operation member from the first position toward the second position.

In the above configuration, when the user releases his/her hand from the operation member, a biasing force of the bias member can move the operation member back to the second position.

In one or more embodiments, the electric working machine may further comprise a resisting member configured to be operated by the operation member when the operation member moves toward the first position and passes the third position. The resisting member may be configured to apply, to the operation member, a force to resist the operation member passing the third position.

In the above configuration, when operating the operation member past the third position, the user needs to apply a greater force to the operation member than a force required when operating the operation member to the third position. Consequently, when operating the operation member, the user can easily recognize whether the operation member has passed the third position, in other words, whether the state has been switched to the state where the second switch transmits the second signal to the control device.

First Embodiment

Figure 2:
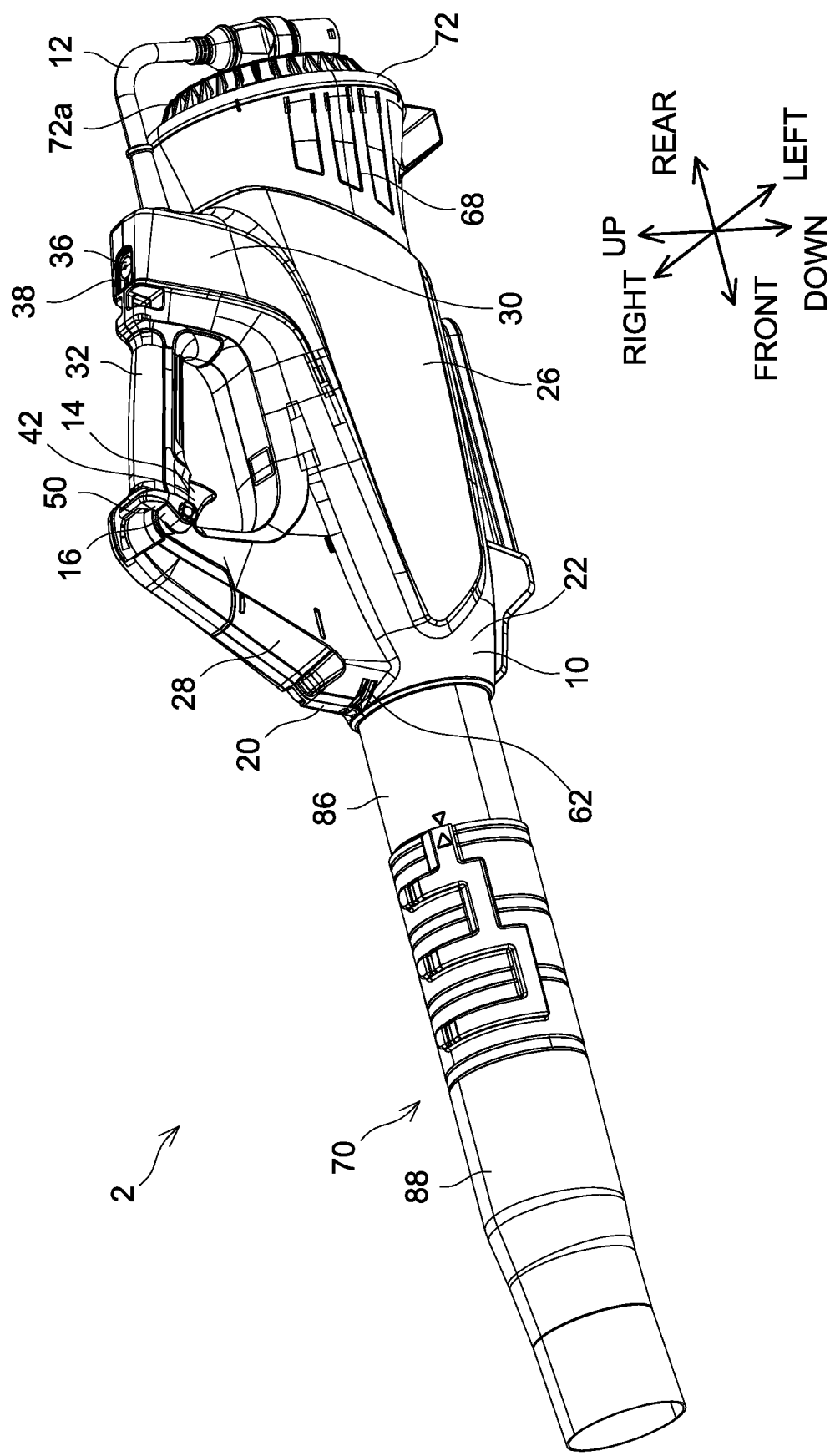
FIG. 2 is a perspective view of the electric working machine 2 of the first embodiment, viewed from the front left side.

Referring to FIGS. 1 to 9, an electric working machine 2 of a first embodiment will be described. The electric working machine 2 is a blower used to blow and collect fallen leaves and the like. As shown in FIGS. 1 and 2, the electric working machine 2 comprises a grip housing 10, a power cable 12, a trigger 14, a cruise control lever 16, and a control device 18 (refer to FIG. 4). In the following explanation, the longitudinal direction of the electric working machine 2 is referred to as a front-rear direction, a direction perpendicular to the front-rear direction is referred to as an up-down direction of the electric working machine 2, and a direction perpendicular to the front-rear direction and the up-down direction is referred to as a right-left direction of the electric working machine 2.

The grip housing 10 is comprised of a right grip housing 20 and a left grip housing 22. The right grip housing 20 defines an exterior form of the right half of the grip housing 10, and the left grip housing 22 defines an exterior form of the left half of the grip housing 10. The grip housing 10 comprises a first housing 26, a second housing 28, a third housing 30, and a fourth housing 32. The first housing 26, the second housing 28, the third housing 30, and the fourth housing 32 are integrally formed. The first housing 26 extends in the front-rear direction.

The second housing 28 extends upward and rearward from the front portion of the upper surface of the first housing 26. The third housing 30 extends rearward and upward from the rear portion of the upper surface of the first housing 26. The fourth housing 32 extends from the upper portion of the rear surface of the second housing 28 toward the upper portion of the front surface of the third housing 30. The cross-sectional shape of the fourth housing 32 is substantially circular. The fourth housing 32 is gripped by an user. The power cable 12 is connected to the rear surface of the third housing 30. Power is supplied to the electric working machine 2 via the power cable 12. The power cable 12 may be connected to for example a backpack battery worn by the user or an external power source.

A main power switch 36 and a main power LED 38 are disposed on the top surface of the third housing 30. The main power switch 36 accepts an operation from the user to switch between an on-state and off-state of the electric working machine 2. The main power LE) 38 indicates the on-state and off-state of the electric working machine 2.

Figure 3:
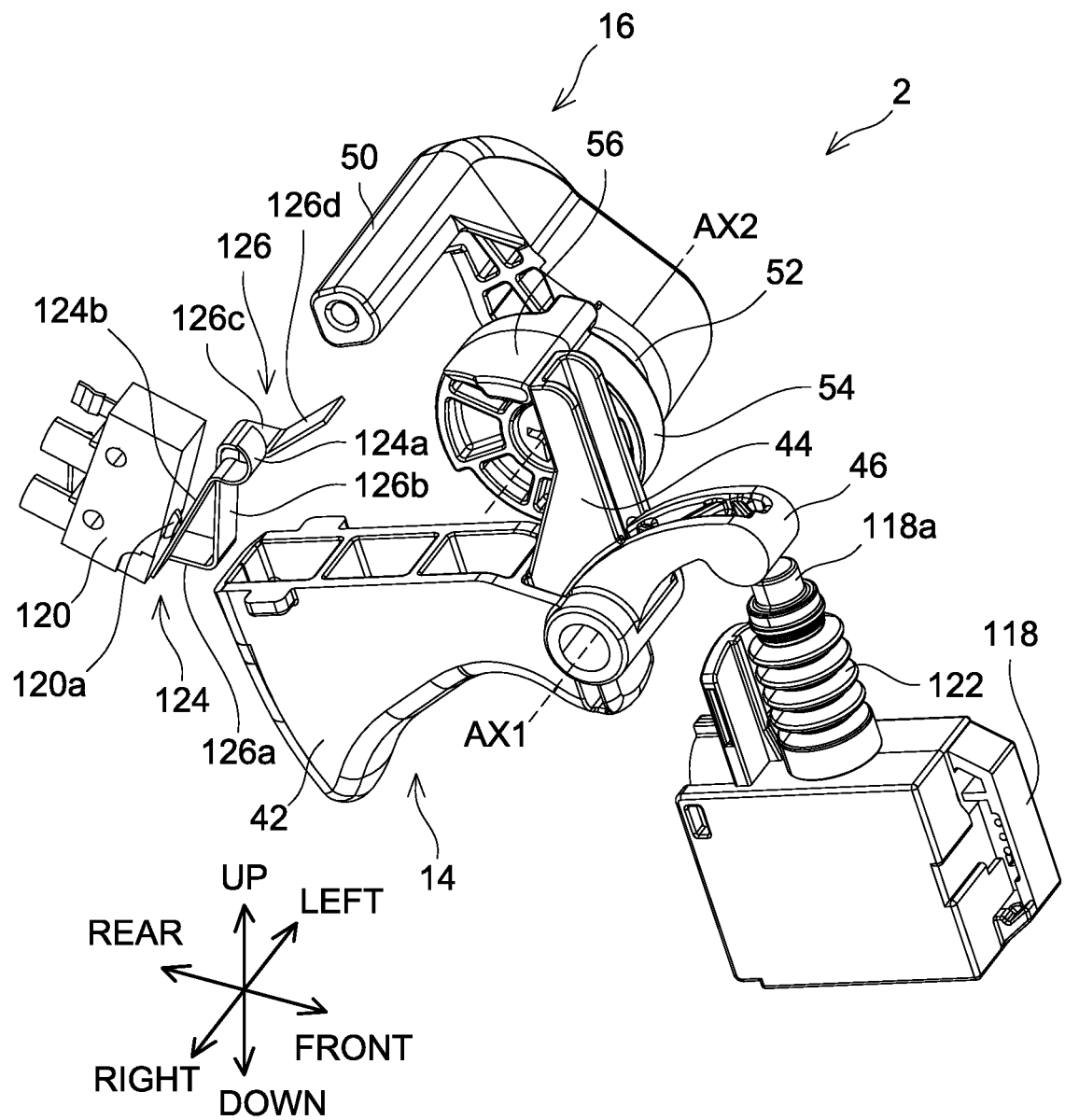
FIG. 3 is a perspective view of a trigger 14, a cruise control lever 16, a first switch 118, a second switch 120, a bias member 122, a plate member 124, and a resisting member 126 of the first embodiment.

The trigger 14 is attached to the front lower portion of the fourth housing 32. The user can operate the trigger 14 with a finger of his/her hand gripping the fourth housing 32. The trigger 14 moves between an initial position at which the trigger 14 is not pressed and a first position at which the trigger 14 is fully pressed. As shown in FIG. 3, the trigger 14 comprises a trigger operation portion 42, a trigger protrusion 44, and a switch pushing portion 46. The trigger operation portion 42, the trigger protrusion 44, and the switch pushing portion 46 are integrally formed. The trigger operation portion 42 is supported by the second housing 28 such that it is pivotable about a pivot axis AX1. When the trigger operation portion 42 is pressed by the user, the trigger operation portion 42 pivots about the pivot axis AX1. The pivot axis AX1 is disposed at the front end of the trigger operation portion 42. Even when the trigger 14 is positioned in the second position, the trigger operation portion 42 protrudes downward through the lower surface of the fourth housing 32.

Figure 6:
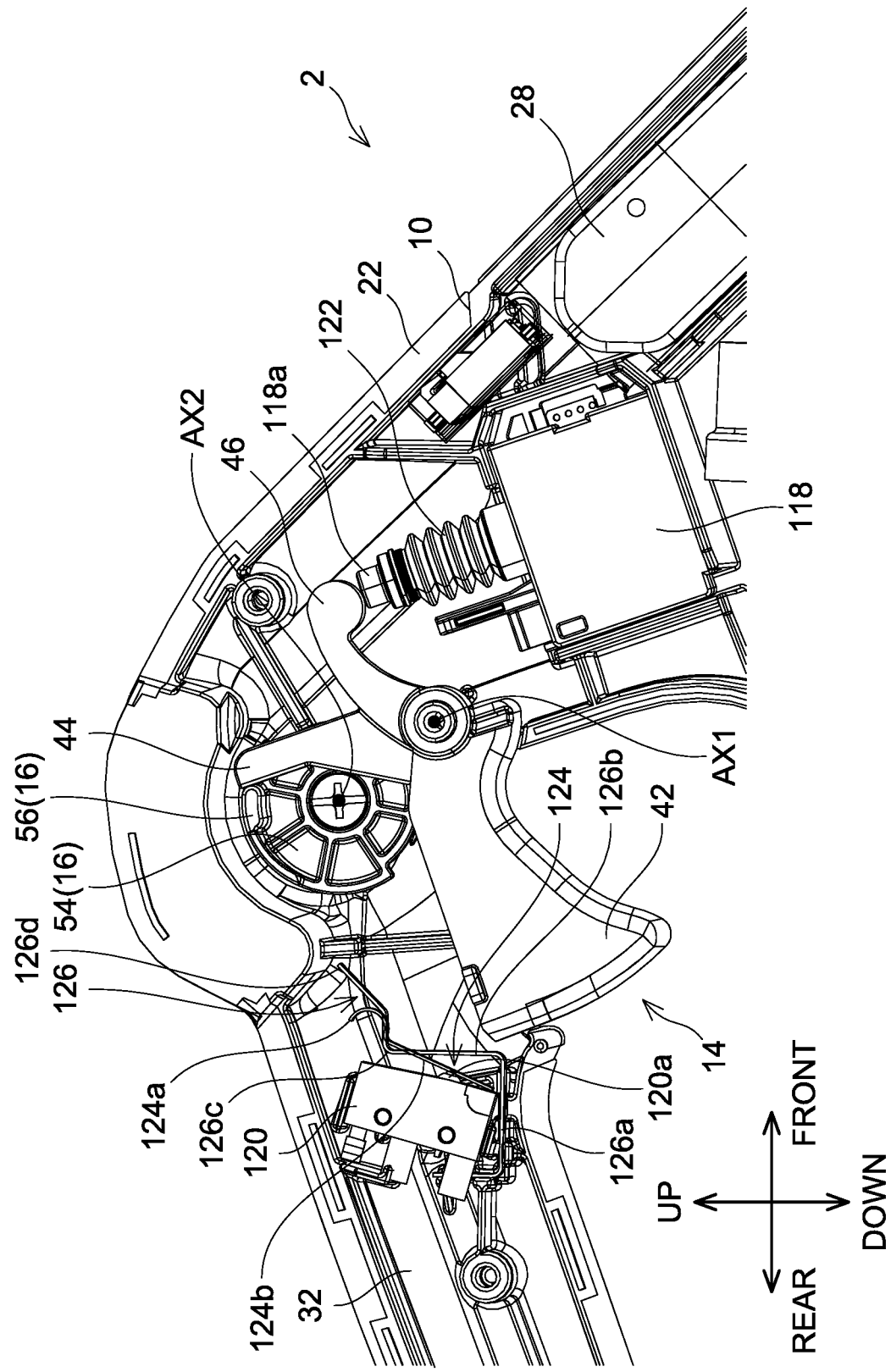
FIG. 6 is a view, in the first embodiment, of the vicinity of the trigger 14 with the right grip housing 20 detached when the trigger 14 is in the second position, viewed from the right side.

As shown in FIG. 6, the trigger protrusion 44 and the switch pushing portion 46 are disposed inside the second housing 28. As shown in FIG. 3, the trigger protrusion 44 is disposed at the front end of the trigger operation portion 42. The trigger protrusion 44 extends in a direction substantially perpendicular to the upper surface of the trigger operation portion 42. The switch pushing portion 46 is disposed at the front end of the trigger operation portion 42. The switch pushing portion 46 extends upward and frontward from the trigger operation portion 42. The trigger protrusion 44 and the switch pushing portion 46 pivot about the pivot axis AX1 along with the trigger operation portion 42.

The cruise control lever 16 comprises a lever operation portion 50, a connecting portion 52, a pivot portion 54, and a stopper 56. As shown in FIG. 2, the lever operation portion 50 is disposed at the exterior of the second housing 28 near the connection point between the second housing 28 and the fourth housing 32. The lever operation portion 50 is operated by the user. As shown in FIG. 3, when the lever operation portion 50 is operated by the user, the lever operation portion 50 pivots about a pivot axis AX2. The connecting portion 52 extends rightward from the right surface of the lever operation portion 50. Although not shown, the connecting portion 52 extends through the left surface of the second housing 28 to the inside of the second housing 28. The pivot portion 54 and the stopper 56 are disposed inside the second housing 28. The pivot portion 54 is connected to the connecting portion 52. The stopper 56 protrudes rightward from the right surface of the pivot portion 54. The stopper 56 can make contact with the trigger protrusion 44 from its rear side. The pivot portion 54 and the stopper 56 pivot about the pivot axis AX2 along with the lever operation portion 50.

A cushion (not shown) is held between the pivot portion 54 and the inner surface of the second housing 28, and the pivot portion 54 is fixed at a desired position by a frictional force applied from the cushion. By the user pivoting the lever operation portion 50 to a desired position, the stopper 56 can be fixed at a desired position. In the state in which the stopper 56 makes contact with the trigger protrusion 44 and is fixed at the desired position, the trigger 14 remains pressed even when the user releases his/her hand from the trigger 14.

Figure 4:
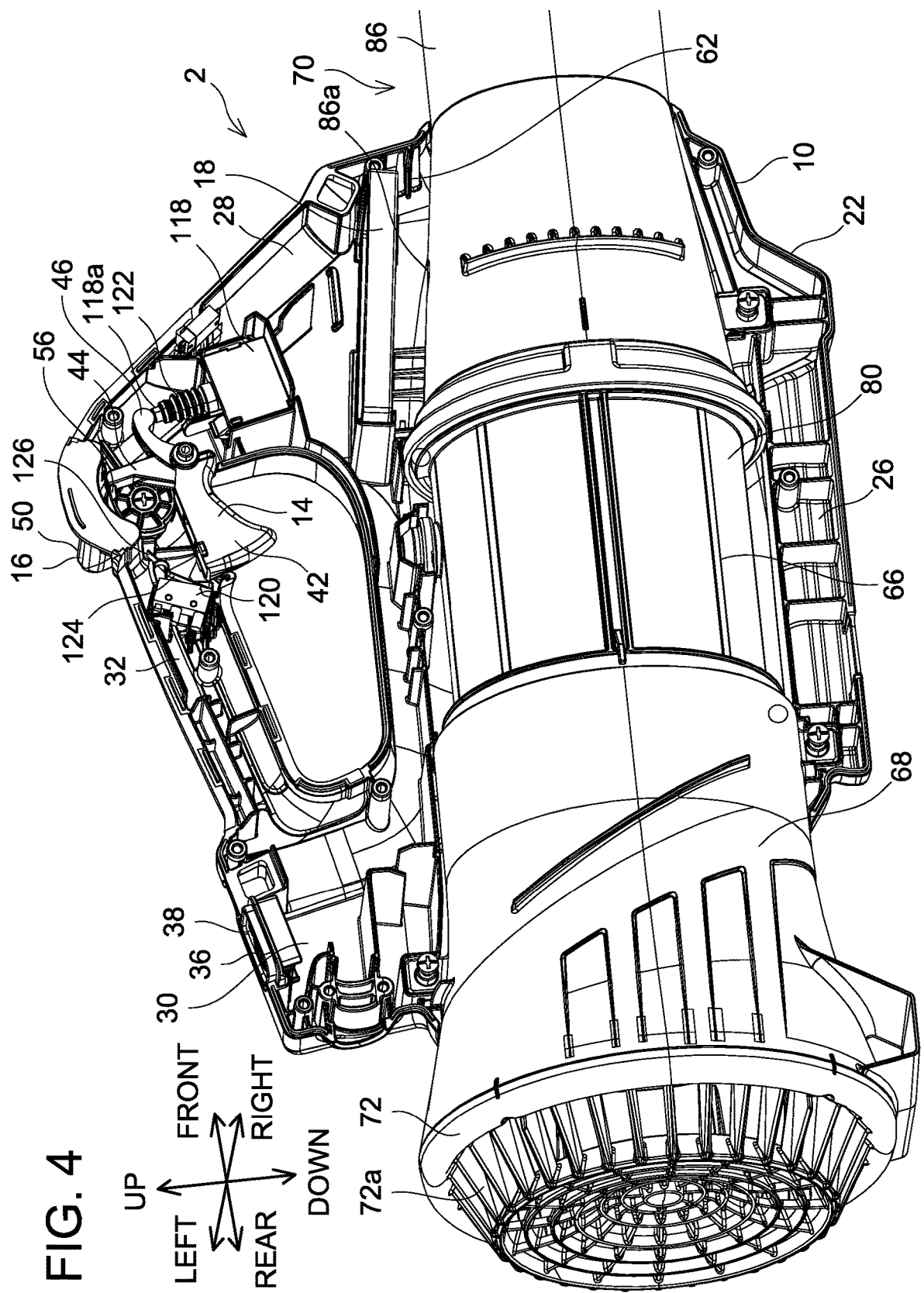
FIG. 4 is a perspective view of the electric working machine 2 of the first embodiment with a right grip housing 20 detached, viewed from the rear right side.

As shown in FIG. 4, an opening 62 is defined in the front surface of the first housing 26. The opening 62 is disposed in the vicinity of the connection point between the first housing 26 and the second housing 28. The opening 62 allows the interior and exterior of the grip housing 10 to communicate with each other.

The control device 18 is disposed inside the first housing 26. The control device 18 is disposed along the front-rear direction and the right-left direction. The control device 18 is disposed in the vicinity of the connection point between the first housing 26 and the second housing 28. With respect to the up-down direction, the control device 18 is disposed upward of the opening 62. Although not shown, the control device 18 is constituted of a control board including a microcomputer and a plurality of switching elements, and a casing to which the control board is attached. The switching elements are, for example, IGBTs or MOSFETs. The switching elements are switched between the on state and off state by being controlled by the microcomputer.

The electric working machine 2 further comprises a motor housing 66, a rear housing 68, an ejection nozzle 70, and a cover member 72. The motor housing 66 is disposed within the first housing 26. The rear housing 68 is coupled to the rear end of the motor housing 66, and protrudes rearward from the rear end of the first housing 26. The rear housing 68 is also fixed to the first housing 26. The ejection nozzle 70 is coupled to the front end of the motor housing 66 and protrudes frontward from the front end of the first housing 26. The ejection nozzle 70 is fixed to the first housing 26.

Figure 5:
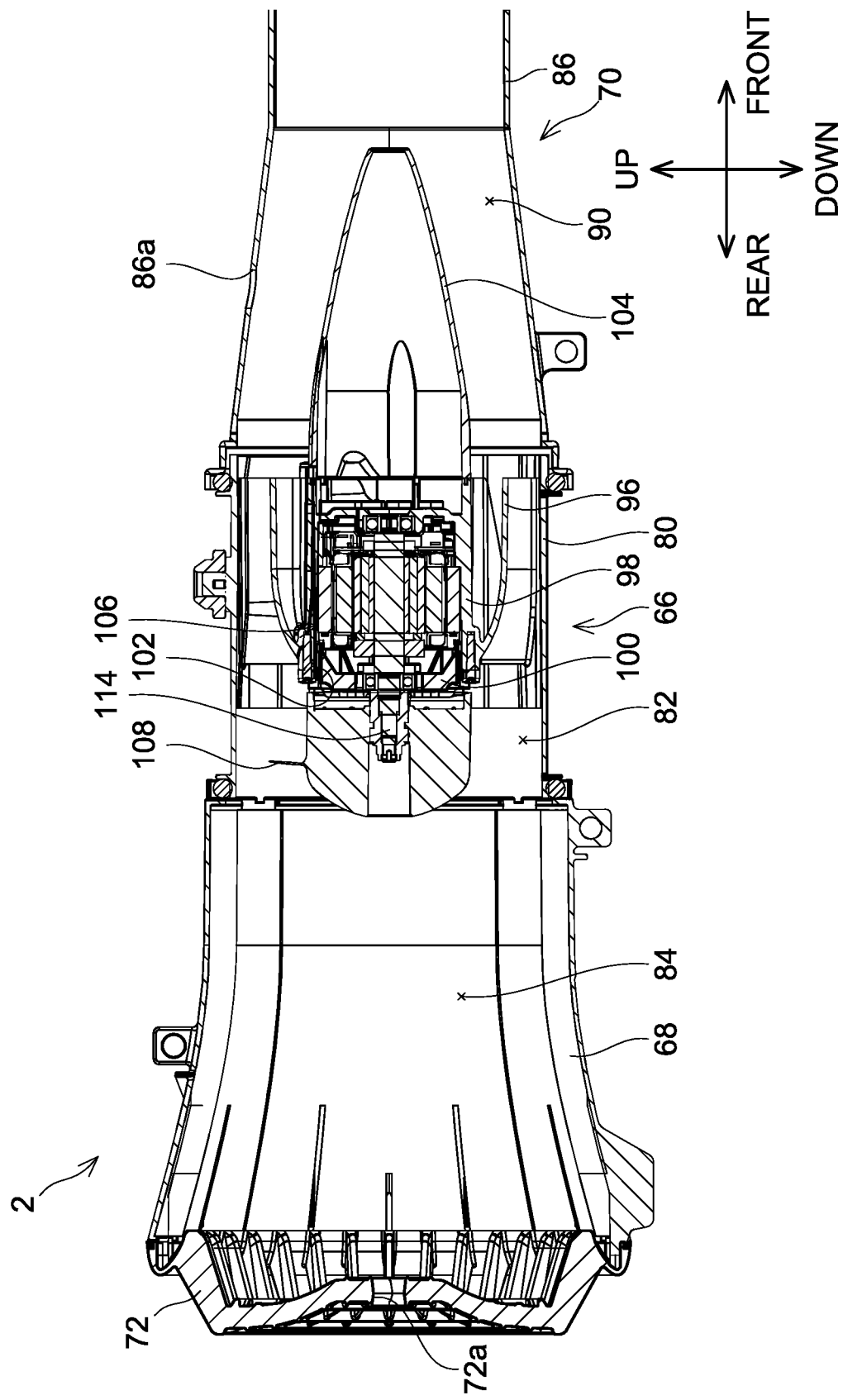
FIG. 5 is a cross-sectional view of the electric working machine 2 of the first embodiment with a grip housing 10 detached.

As shown in FIG. 5, the rear housing 68 has a cylindrical shape, and a diameter of the inner circumferential surface of the cylindrical shape is reduced toward the front side from the rear side. The rear housing 68 includes an upstream passage 84 therein. The cover member 72 is attached to the rear end of the rear housing 68. The cover member 72 covers a rear end opening of the rear housing 68. The cover member 72 has a plurality of inlet holes 72a. The plurality of inlet holes 72a penetrates the cover member 72 in the front-rear direction. The plurality of inlet holes 72a allows the outside of the electric working machine 2 and the upstream passage 84 of the rear housing 68 to communicate with each other.

The ejection nozzle 70 comprises a first ejection nozzle 86 and a second ejection nozzle 88 (see FIG. 1). The second ejection nozzle 88 is detachably attached to the front portion of the first ejection nozzle 86. The first ejection nozzle 86 and the second ejection nozzle 88 have cylindrical shapes. The first ejection nozzle 86 and the second ejection nozzle 88 have a downstream passage 90 therein. An opening 86a is defined in the upper end of the first ejection nozzle 86. The opening 86a is disposed downward of the control device 18.

The motor housing 66 comprises an outer cylindrical member 80, a plurality of fins 96, an inner cylindrical member 98, and a lid member 100. The outer cylindrical member 80, the plurality of fins 96, and the inner cylindrical member 98 are integrally formed. The outer cylindrical member 80 has a cylindrical shape extending in the front-rear direction. The outer cylindrical member 80 has an air passage 82 therein. The upstream end of the air passage 82 communicates with the upstream passage 84 of the rear housing 68, and the downstream end of the air passage 82 communicates with the downstream passage 90 of the ejection nozzle 70. The plurality of fins 96 extends toward the central axis of the outer cylindrical member 80 from the inner circumferential surface of the outer cylindrical member 80. Although not shown, the plurality of fins 96 is arranged and equally spaced apart from one another in the circumferential direction of the inner circumferential surface of the outer cylindrical member 80.

The inner cylindrical member 98 is disposed inside the outer cylindrical member 80. The inner cylindrical member 98 extends in the front-rear direction. The plurality of fins 96 extending from the inner circumferential surface of the outer cylindrical member 80 is connected to the outer circumferential surface of the inner cylindrical surface. The lid member 100 is attached to the rear end of the inner cylindrical member 98. The lid member 100 closes a rear end opening 102 of the inner cylindrical member 98. A plurality of holes (not shown) is defined in the rear end of the lid member 100. A cone 104 is attached to the front end of the inner cylindrical member 98. A diameter of the outer circumferential surface of the cone 104 is reduced from the rear side toward the front side. A tip opening is defined at the tip of the cone 104.

The electric working machine 2 further comprises an electric motor 106 and a fan 108. The electric motor 106 is for example an inner rotor brushless motor. The electric motor 106 is disposed inside the inner cylindrical member 98. A microcomputer (not shown) of the control device 18 performs control of switching the on-state and off-state of switching elements (not shown), by which an operation of the electric motor 106 is controlled.

The fan 108 is for example an axial flow fan. The fan 108 rotates driven by the electric motor 106. When the fan 108 rotates, a negative pressure is applied to the rear portion of the fan 108. Consequently, air flows from the plurality of inlet holes 72a of the cover member 72 into the upstream passage 84 of the rear housing 68, and flows into the air passage 82 of the outer cylindrical member 80. Thereafter, the air is forced frontward by the fan 108, flows through the air passage 82 and then the downstream passage 90, and flows out of the tip opening of the second ejection nozzle 88. Further, a portion of the air forced frontward by the fan 108 enters the inside of the inner cylindrical member 98 from a plurality of holes (not shown) defined in the rear end of the lid member 100, flows frontward within the inner cylindrical member 98, and frows from the tip opening of the cone 104 to the downstream passage 90. Consequently, the electric motor 106 is cooled. Furthermore, a portion of the air flowing in the downstream passage 90 passes through the opening 86a and flows out of the first ejection nozzle 86. The air having frown out flows between the lower surface of the control device 18 and the outer circumferential surface of the first ejection nozzle 86, and flows out of the grip housing 10 from the opening 62. Consequently, the control device 18 is cooled.

Figure 7:
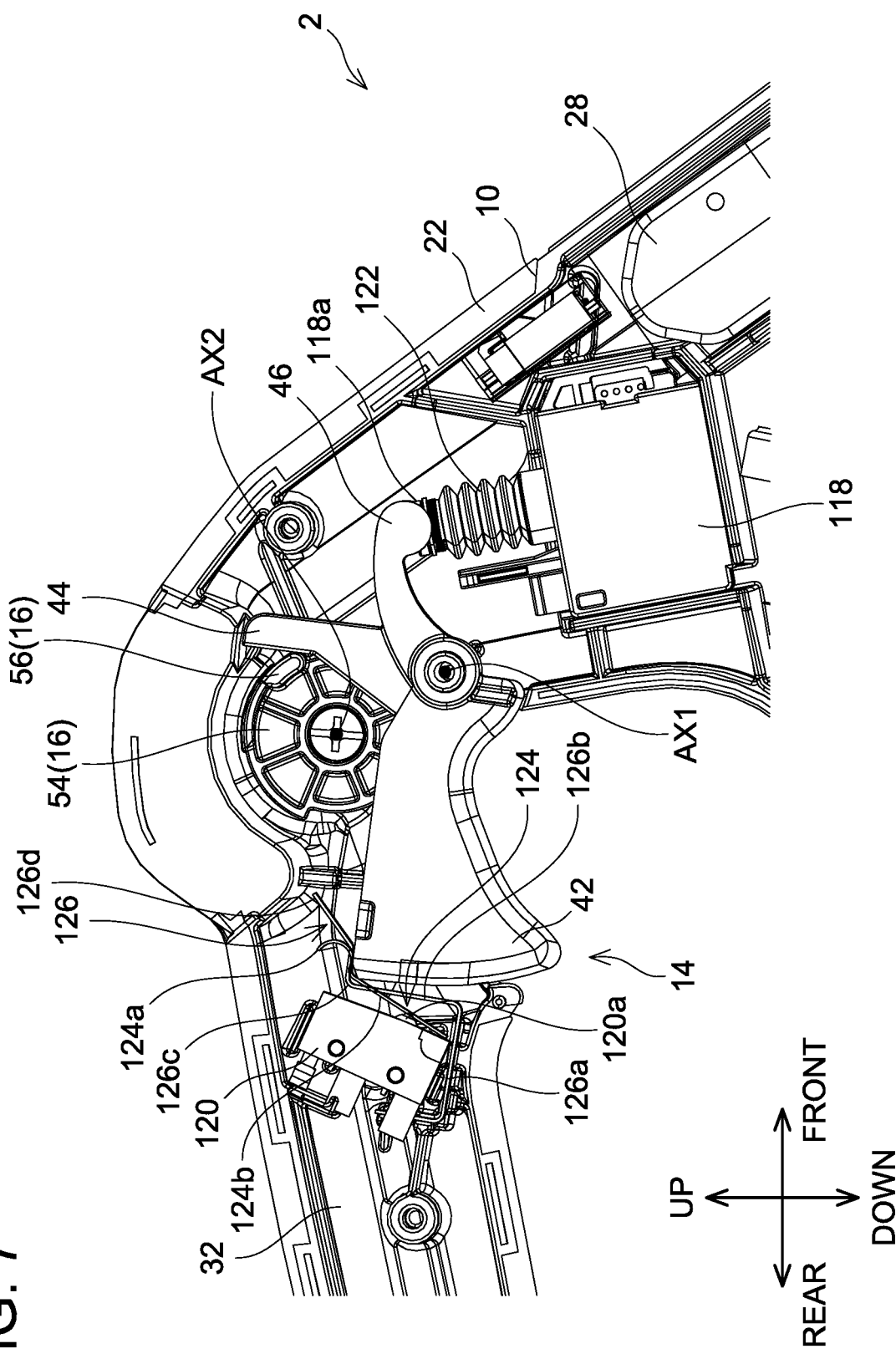
FIG. 7 is a view, in the first embodiment, of the vicinity of the trigger 14 with the right grip housing 20 detached when the trigger 14 is in the third position, viewed from the right side.
Figure 8:
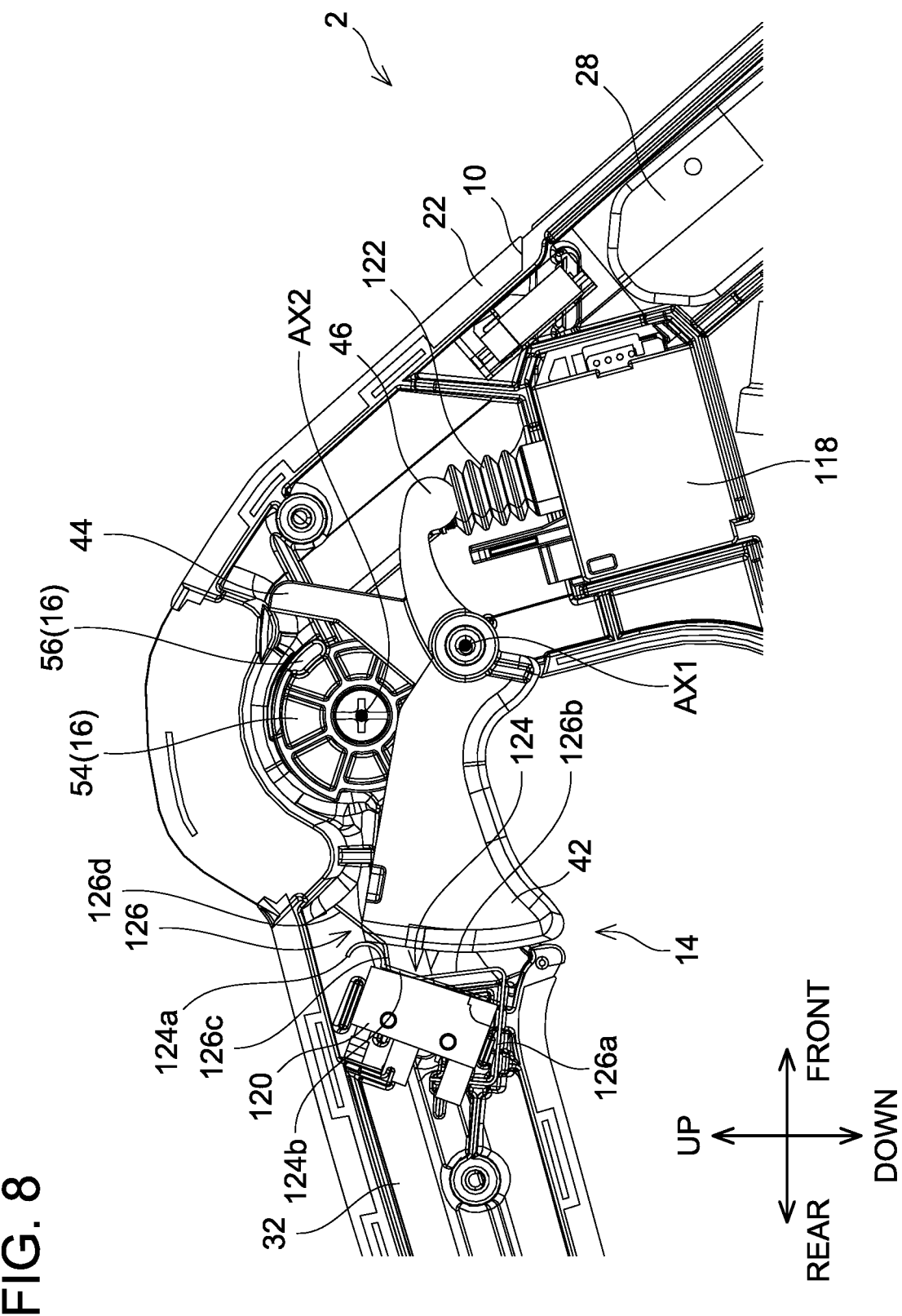
FIG. 8 is a view, in the first embodiment, of the vicinity of the trigger 14 with the right grip housing 20 detached when the trigger 14 is in the first position, viewed from the right side.

As shown in FIG. 6, the electric working machine 2 further comprises a first switch 118, a second switch 120, a bias member 122, a plate member 124, and a resisting member 126. The first switch 118 and the second switch 120 are electrically connected to the control device 18. The first switch 118 and the bias member 122 are disposed inside the second housing 28. The first switch 118 includes a first switch button 118a. The first switch button 118a is not pushed while the trigger 14 moves between the initial position and the second position. The second position is at a position slightly closer to the first position than the initial position. As a result, even when the user accidentally touches the trigger 14 positioned at the initial position, the first switch button 118a can be prevented from being pushed. As shown in FIGS. 7 and 8, when the trigger 14 passes the third position, the first switch button 118a is pushed by the switch pushing portion 46. When the first switch button 118a is pushed, a first signal is transmitted from the first switch 118 to the control device 18. The first signal is a signal that changes in accordance with an amount to which the first switch button 118a is pushed. In the present embodiment, the magnitude of the first signal gradually increases as the amount to which the first switch button 118a is pushed increases. The bias member 122 surrounds the first switch button 118a. The bias member 122 biases the first switch button 118a such that it goes back to the second position. Consequently, even when the user releases a finger of his/her hand from the trigger operation portion 42, the switch pushing portion 46 is biased in the direction from the first position toward the second position, and returns to the second position.

As shown in FIG. 6, the second switch 120, the plate member 124 and the resisting member 126 are disposed inside the fourth housing 32. The plate member 124 comprises a linear portion 124b and a curved portion 124a. The linear portion 124b is disposed frontward of the second switch 120. The lower end of the linear portion 124b is fixed to the lower portion of the second switch 120. The curved portion 124a curves frontward from the upper end of the linear portion 124b, and then curves rearward.

The resisting member 126 comprises a fixed portion 126a, a first linear portion 126b, a second linear portion 126c, and a third linear portion 126d. The fixed portion 126a is fixed to the fourth housing 32. The fixed portion 126a extends substantially downward, bends and then extends substantially frontward. The first linear portion 126b extends substantially upward from the front end of the fixed portion 126a. The second linear portion 126c extends substantially frontward from the upper end of the first linear portion 126b. The third linear portion 126d extends upward and frontward from the front end of the second linear portion 126c.

The curved portion 124a and the second linear portion 126c are not in contact with the trigger operation portion 42 when the trigger 14 moves between the initial position and the third position. The third position is at a position between the initial position and the first position, and is located closer to the first position than the second position. As shown in FIG. 7, when the trigger 14 moves from the initial position to the third position, the curved portion 124a and the second linear portion 126c make contact with the trigger operation portion 42. As shown in FIG. 8, when the trigger 14 passes the third position and moves toward the first position, the curved portion 124a is pushed rearward by the trigger operation portion 42. Consequently, the linear portion 124b is pushed rearward, and the second switch button 120a of the second switch 120 (see FIGS. 6 and 7) is pushed by the linear portion 124b. When the second switch button 120a is pushed, a second signal is transmitted from the second switch 120 to the control device 18. The second signal is a constant signal irrelevant to the amount to which the second switch button 120a is pushed. On the other hand, when the trigger 14 passes the third position and moves toward the first position, the second linear portion 126c is pushed upward by the trigger operation portion 42, and the first linear portion 126b, the second linear portion 126c, and the third linear portion 126d are bent rearward due to elastic deformation. At this time, the trigger operation portion 42 is switched from the state of being in contact with the second linear portion 126c to the state of being in contact with the third linear portion 126d. When the trigger 14 moves between the second position and the third position, a biasing force by the bias member 122 is applied to the trigger 14 toward the second position. In contrast, when the trigger 14 passes the third position and moves toward the first position, not only the biasing force by the bias member 122 toward the second position but also the elastic restorative force of the resisting member 126 toward the second position act on the trigger 14. That is, when the trigger 14 passes the third position and further moves, a force resisting the trigger 14 passing the third position is applied to the trigger operation portion 42. The force required for the user to operate the trigger 14 past the third position is greater than the force required for the user to operate the trigger 14 toward the third position.

Next, referring to FIGS. 6 to 9, the control of the electric motor 106 performed by the control device 18 will be described. While the trigger 14 moves between the initial position and the second position, as shown in FIG. 6, the first switch button 118a is not pushed by the switch pushing portion 46, and the second switch button 120a is not pushed by the trigger operation portion 42. Therefore, neither the first signal nor the second signal is transmitted to the control device 18, thereby the control device 18 does not control the electric motor 106. Consequently, since the fan 108 does not rotate, air does not flow out of the tip opening of the second ejection nozzle 88.

Figure 9:
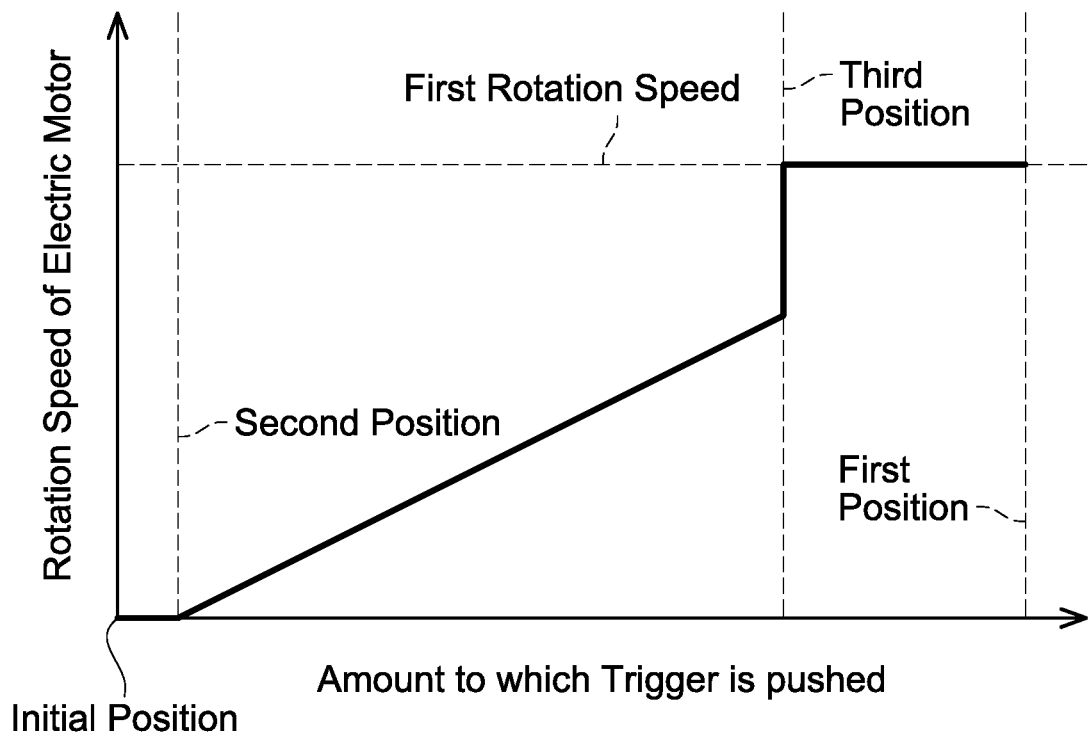
FIG. 9 is a diagram showing a relationship between an operation amount of the trigger 14 and a rotation speed of an electric motor 106 of the first embodiment.

When the trigger 14 moves from the second position toward the third position, the first switch button 118a is pushed by the switch pushing portion 46 as shown in FIG. 7. The amount to which the first switch button 118a is pushed increases as the trigger 14 moves from the second position to the third position. On the other hand, the second switch button 120a is not pushed by the trigger operation portion 42. Consequently, only the first signal is transmitted to the control device 18, while the second signal is not transmitted to the control device 18. The magnitude of the first signal to be transmitted increases as the amount to which the first switch button 118a is pushed increases. In this case, as shown in FIG. 9, the control device 18 controls the electric motor 106 such that a rotation speed of the electric motor 106 increases as the amount to which the first switch button 118a is pushed increases. Hereinbelow, the mode in which the control device 18 controls the electric motor 106 based on the first signal is referred to as a first mode. As the rotation speed of the electric motor 106 increases, the rotation speed of the fan 108 increases and the flow rate of air flowing out of the tip opening of the second ejection nozzle 88 increases.

When the trigger 14 passes the third position and moves toward the first position, the second switch button 120a is pushed by the trigger operation portion 42 as shown in FIG. 8. In addition, the first switch button 118a is continuously pushed by the switch pushing portion 46. Therefore, both of the first and second signals are transmitted to the control device 18. The magnitude of the second signal is constant regardless of the amount to which the second switch button 120a is pushed. As shown in FIG. 9, when the control device 18 receives the second signal while executing the first mode based on the first signal, the control device 18 stops control of the electric motor 106 in the first mode and controls the electric motor 106 based on the second signal such that the electric motor 106 rotates at a first rotation speed. Hereinbelow, the mode in which the control device 18 controls the electric motor 106 based on the second signal is referred to as a second mode. The first rotation speed of the electric motor 106 when operating in the second mode is a rotation speed higher than the maximum rotational speed of the electric motor 106 when operating in the first mode. In the present embodiment, the first rotation speed is 1.3 times the maximum rotational speed of the electric motor 106 when operating in the first mode. When the electric motor 106 operates in the second mode, the rotation speed of the fan 108 is higher as compared with the case where the electric motor 106 operates in the first mode, thereby the flow rate of the air flowing out of the tip opening of the second ejection nozzle 88 increases.

When the electric motor 106 operates in the second mode, the amounts of heat generated by the electric motor 106 and the control device 18 are larger as compared with the case where the electric motor 106 operates in the first mode, thereby the electric motor 106 and the control device 18 tend to overheat. Due to this, the electric motor 106 cannot be operated for a long time in the second mode. In the present embodiment, when a first period elapses since when the second signal is transmitted, that is, when the first period elapses since when the electric motor is operated in the second mode, the control device 18 stops the control of the electric motor 106 in the second mode, and operates the electric motor 106 in the first mode. Consequently, the rotation speed of the electric motor 106 becomes lower than the first rotational speed of the electric motor 106 when operating in the second mode. As a result, overheat of the electric motor 106 and the control device 18 can be prevented.

(Effect)

The electric working machine 2 of the present embodiment comprises the electric motor 106; the control device 18 configured to control the electric motor 106; the trigger 14 configured to be operated by the user and configured to be movable to the first position; the first switch 118 configured to be operated by the trigger 14 while the trigger 14 moves to the first position; and the second switch 120 configured to be operated by the trigger 14 while the trigger 14 moves to the first position. The trigger 14 passes the second position and the third position while the trigger 14 moves to the first position. The first switch 118 is configured to transmit the first signal which changes as the trigger 14 moves from the second position to the first position to the control device 18 when the trigger 14 moves between the second position and the first position. The second switch 120 is configured to transmit the second signal to the control device 18 when the trigger 14 moves toward the first position and passes the third position. The control device 18 is configured to control the electric motor 106 based on the first signal and the second signal. In the above configuration, the first switch 118 transmits the first signal to the control device 18, and the second switch 120 transmits the second signal to the control device 18. That is, neither of the switches changes a type of the signal it sends depending on the position of the trigger 14. With such a configuration, it is possible to use reliable components which have been generally used as the first switch 118 and the second switch 120, thereby the second position for the first switch 118 and the third position for the second switch 120 tend not to vary due to manufacturing variations. Therefore, variations in the timings at which the first switch 118 starts transmitting the first signal and variations in the timings at which the second switch 120 starts transmitting the second signal can be reduced. Consequently, variations in the performances of electric working machines 2 can be reduced.

The third position is located closer to the first position than the second position. In the above configuration, when the trigger 14 moves between the second position and the third position, only the first signal is transmitted to the control device 18, while the second signal is not transmitted to the control device 18. By moving the trigger 14 between the second position and the third position, the user can operate the electric motor 106 by the control by the control device 18 based on the first signal.

The control device 18 is configured to control the electric motor 106 based on the second signal when both of the first signal and the second signal are transmitted to the control device 18. In the above configuration, when the trigger 14 moves between the second position and the third position, the control device 18 controls the electric motor 106 based on the first signal, while controls the electric motor 106 based on the second signal when the trigger 14 passes the third position. By adjusting the position of the trigger 14, the user can selectively use the operation of the electric motor 106 based on the first signal and an operation of the electric motor 106 based on the second signal.

The electric motor 106 functions as an electric unit. The electric working machine 2 further comprises the fan 108 configured to be driven by the electric motor 106 and the ejection nozzle 70 configured to allow air forced by the fan 108 to flow inside the ejection nozzle 70. The above-mentioned electric working machine 2 functions as a blower. In the above configuration, by virtue of the control device 18 controlling the electric motor 106 based on the first signal and the second signal, the flow rate of the air to be flown out of the ejection nozzle 70 can be adjusted based on the respective signals.

The control device 18 is configured to: perform control for increasing the rotation speed of the electric motor 106 based on the first signal as the trigger 14 moves from the second position to the first position; and perform control for changing the rotation speed of the electric motor 106 to the first rotation speed based on the second signal. In the above configuration, the control device 18 controls the rotation speed of the electric motor 106 based on the first signal and the second signal. By adjusting the position of the trigger 14, the user can adjust the rotation speed of the electric motor 106 to a desired rotational speed, by which the flow rate of the air to be flown out of the ejection nozzle can be adjusted to a desirable amount.

The first rotation speed is higher than the maximum rotation speed of the electric motor 106 when the control device 18 controls the electric motor 106 based on the first signal. In the above configuration, when the control device 18 controls the electric motor 106 based on the second signal, it is possible to reach a rotation speed exceeding the range of the rotational speed of the electric motor 106 controlled by the control device 18 based on the first signal. Thereby, the convenience of the user can be enhanced.

The trigger 14 functions as an operation member configured to be pressed by the user. In the above configuration, the user can control the operation of the electric working machine 2 with a simple operation.

The electric working machine 2 further comprises the bias member 122 configured to bias the trigger 14 from the first position toward the second position. In the above configuration, when the user releases his/her hand from the trigger 14, the biasing force of the bias member 122 can move the trigger 14 back to the second position.

The electric working machine 2 further comprises the resisting member 126 configured to be operated by the trigger 14 when the trigger 14 moves toward the first position and passes the third position. The resisting member 126 is configured to apply, to the trigger 14, a force to resist the operation member passing the third position. In the above configuration, when operating the trigger 14 past the third position, the user needs to apply the greater force to the trigger 14 than the force required when operating the trigger 14 to the third position. Consequently, when operating the trigger 14, the user can easily recognize whether the trigger 14 has passed the third position, in other words, whether the state has been switched to the state where the second switch 120 transmits the second signal to the control device 18.

(Correspondence Relationship)

The electric motor 106 is an example of "electric unit", and the trigger 14 is an example of "operation member".

First Variant of First Embodiment

Figure 10:
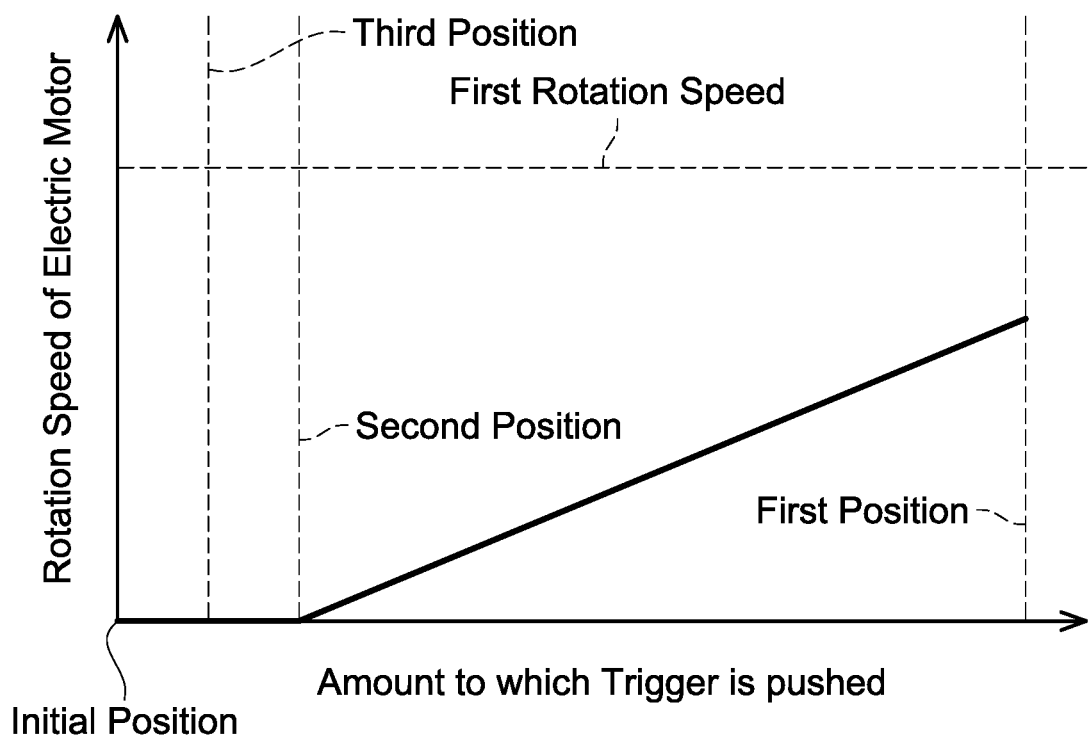
FIG. 10 is a diagram showing a relationship between an operation amount of the trigger 14 and a rotation speed of the electric motor 106 of a first variant.

A first variant of the first embodiment will be described with reference to FIG. 10. In the first variant of the first embodiment, the points different from the first embodiment will only be described, the same reference signs are given to the same points as those of the first embodiment, and the description thereof is omitted. In the first variant of the first embodiment, the second position at which the first switch button 118a is operated is located at a position closer to the first position than the second position of the first embodiment. In addition, the third position at which the second switch button 120a is operated is located between the initial position and the second position. In this configuration, while the trigger 14 moves between the initial position and the third position, the first switch button 118a is not pushed by the switch pushing portion 46, and the second switch button 120a is not pushed by the trigger operation portion 42. Consequently, neither the first signal nor the second signal is transmitted to the control device 18, thereby the control device 18 does not operate the electric motor 106. When the trigger 14 passes the third position and moves toward the first position, the second switch button 120a is pushed by the trigger operation portion 42 and the second signal is transmitted to the control device 18, while the first switch button 118a is not pushed by the switch pushing portion 46 and the first signal is not transmitted to the control device 18. In the present variant, when the electric working machine 2 is switched from the off state to the on state by the operation of the main power switch 36, neither of the first and second signals is transmitted to the control device 18, and then, the control device 18 brings the electric motor 106 to a stand-by mode only when the second signal is transmitted to the control device 18. Thereafter, the control device 18 performs control of the control device 18 based on the first signal only when the electric motor 106 is in the standby mode and the first signal is transmitted. Therefore, for example, when the trigger 14 is operated to a position between the third position and the second position while the electric working machine 2 is in the off state and then the electric working machine 2 is switched from the off state to the on state, the electric motor 106 is not driven even when the first signal is transmitted to the control device 18 due to the trigger 14 being operated and passing the second position. In a variant, the control device 18 may disable the stand-by mode when the first signal is not transmitted even after a predetermined period elapses since when the electric motor 106 is brought to the stand-by mode.

When the trigger 14 passes the second position while the electric motor 106 is in the standby mode, the first switch button 118a is pushed by the switch pushing portion 46, and the first signal is transmitted to the control device 18. The control device 18 operates the electric motor 106 in the standby mode based on the first signal. In the present variant, the rotation speed of the electric motor 106 increases as the amount to which the first switch button 118a is pushed increases, and the electric motor 106 does not rotate at the first rotation speed.

Second Variant of First Embodiment

Figure 11:
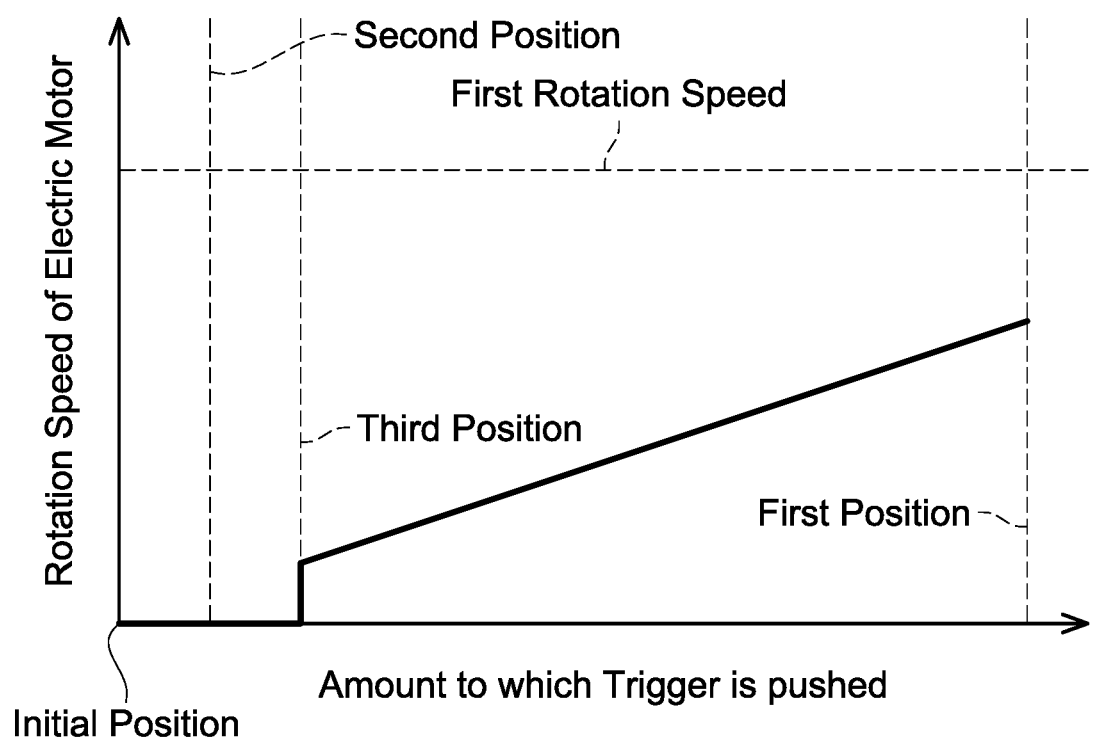
FIG. 11 is a diagram showing a relationship between an operation amount of the trigger 14 and a rotation speed of the electric motor 106 of a second variant.
Figure 12:
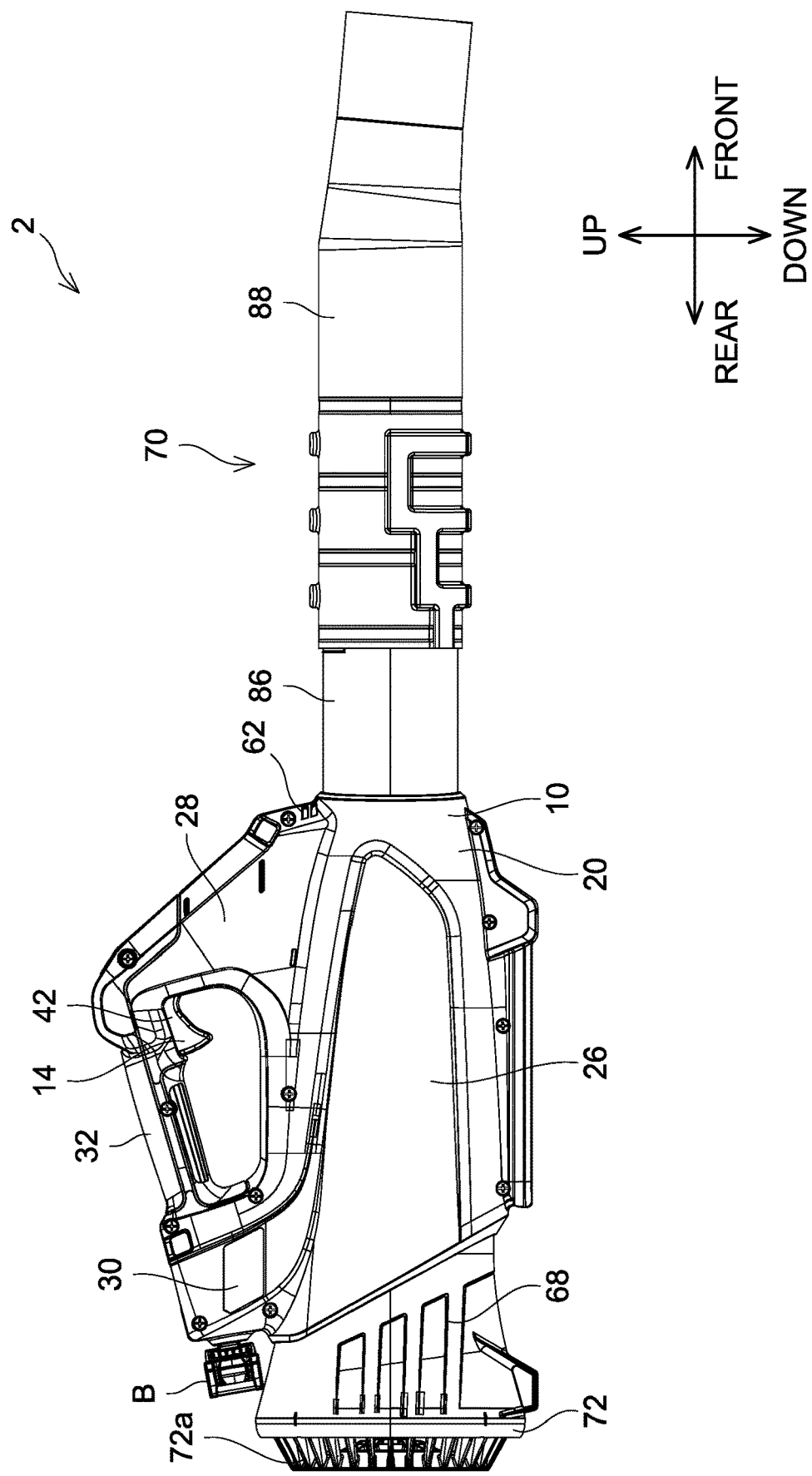
FIG. 12 is a view of an electric working machine 2 of a second embodiment, viewed from the right side.

A second variant of the first embodiment will be described with reference to FIG. 11. In the second variant of the first embodiment, the points different from the first embodiment will only be described, the same reference signs are given to the same points as those of the first embodiment, and the description thereof is omitted. In the second variant of the first embodiment, the control device 18 operates the electric motor 106 when the second signal is transmitted in the state where the first signal is being transmitted. In the second variant of the first embodiment, the third position at which the second switch button 120a is operated is located at a position closer to the initial position than the third position of the first embodiment. In this configuration, while the trigger 14 moves between the initial position and the second position, the first switch button 118a is not pushed by the switch pushing portion 46, and the second switch button 120a is not pushed by the trigger operation portion 42. Therefore, neither of the first signal nor the second signal is transmitted to the control device 18, and the control device 18 does not operate the electric motor 106. When the trigger 14 passes the second position and moves toward the third position, the first switch button 118a is pushed by the switch pushing portion 46 and the first signal is transmitted to the control device 18, while the second switch 120 is not pushed by the trigger operation portion 42 and the second signal is not transmitted to the control device 18. In this case, the control device 18 does not operate the electric motor 106. When the trigger 14 passes the third position, the second switch button 120a is pressed by the trigger operation portion 42, and the second signal is transmitted to the control device 18. That is, in the state where the first signal is being transmitted to the control device 18, the second signal is transmitted to the control device 18. In this case, the control device 18 operates the electric motor 106. In the present variant, the rotation speed of the electric motor 106 increases as the amount to which the first switch button 118a is pushed increases, and the electric motor 106 does not rotate at the first rotation speed. Ina variant, when the second signal is not transmitted even after a predetermined period elapses since when the first signal is transmitted, the control device 18 may not control the electric motor 106 even when the second signal is transmitted after the predetermined period Second Embodiment The second embodiment will be described with reference to FIG. 12. In the second embodiment, the points different from the first embodiment will only be described, the same reference signs are given to the same points as those of the first embodiment, and the description thereof is omitted. The second embodiment differs from the first embodiment in that the electric working machine 2 of the second embodiment comprises a battery pack B in place of the power cable 12. The battery pack B includes lithium-ion battery cells. Power of the battery pack B is supplied to the electric motor 106. The battery pack B is detachably attached to the rear surface of the third housing 30. By sliding the battery pack B rightward with respect to the third housing 30, the battery pack B is attached to the third housing 30, and by sliding the battery pack B leftward with respect to the third housing 30, the battery pack B is detached from the third housing 30. In a variant, by sliding the battery pack B downward with respect to the third housing 30, the battery pack B may be attached to the third housing 30, and by sliding the battery pack B upward with respect to the third housing 30, the battery pack B may be detached from the third housing 30. The battery pack B may be detachably attached to the first housing 26 or the second housing 28.

In the electric working machine 2 according to one embodiment, the second position may be the same as the initial position.

The electric working machine 2 according to one embodiment may further comprise a chemical solution container and a solenoid valve. The chemical solution container may contain a chemical solution. The solenoid valve may open when the second switch button 120a is pushed. When the solenoid valve opens, the chemical solution contained in the chemical solution container is supplied to the air passage 82 of the motor housing 66. Consequently, the chemical solution flows out of the tip opening of the second ejection nozzle 88 along with air.

In the electric working machine 2 according to one embodiment, the first switch 118 and the second switch 120 may be disposed in the same casing and constitute a single switch unit.

The electric working machine 2 according to one embodiment may further comprises temperature sensor(s) for detecting temperature(s) of the electric motor 106 and/or the control device 18. When operating the electric motor 106 based on the second signal, the control device 18 may control the electric motor 106 based on the first signal when at least one of the temperatures of the electric motor 106 and the control device 18 exceeds a predetermined temperature.

The electric working machine 2 according to one embodiment is not limited to a blower, and may be, for example, a chain saw or a lawn mower. In this case, a rotation speed of a saw chain or a cutting blade is controlled by the control device 18.

The electric unit according to one embodiment is not limited to the electric motor 106, and may be, for example, an LED light. In this case, a light intensity is controlled by the control device 18.

What is claimed is:
1. An electric working machine comprising:
an electric unit;
a control device configured to control the electric unit;

an operation member configured to be operated by a user and configured to be movable to a first position;

a first switch configured to be operated by the operation member while the operation member moves to the first position; and a second switch configured to be operated by the operation member while the operation member moves to the first position, wherein the operation member passes a second position and a third position while the operation member moves to the first position, the first switch is configured to transmit a first signal which changes as the operation member moves from the second position to the first position to the control device when the operation member moves between the second position and the first position, the second switch is configured to transmit a second signal to the control device when the operation member moves toward the first position and passes the third position, and the control device is configured to control the electric unit based on the first signal and the second signal, the third position is located closer to the first position than the second position, and the control device is configured to control the electric unit based on the second signal when both of the first signal and the second signal are transmitted to the control device.

2. The electric working machine according to claim 1, wherein the electric unit includes an electric motor, and the electric working machine further comprises:

a fan configured to be driven by the electric motor; and an ejection nozzle configured to allow air forced by the fan to flow inside the ejection nozzle.

3. The electric working machine according to claim 2, wherein the control device is configured to:

perform control for increasing a rotation speed of the electric motor based on the first signal as the operation member moves from the second position to the first position; and perform control for changing the rotation speed of the electric motor to a first rotation speed based on the second signal.

4. The electric working machine according to claim 3, wherein the first rotation speed is higher than a maximum rotation speed of the electric motor when the control device controls the electric motor based on the first signal.

5. The electric working machine according to claim 1, wherein the operation member includes a trigger configured to be pressed by the user.

6. The electric working machine according to claim 1, further comprising a bias member configured to bias the operation member from the first position toward the second position.

7. The electric working machine according to claim 6, further comprising a resisting member configured to be operated by the operation member when the operation member moves toward the first position and passes the third position, wherein the resisting member is configured to apply, to the operation member, a force to resist the operation member passing the third position.

8. The electric working machine according to claim 4, wherein when both of the first signal and the second signal are transmitted to the control device, the control device is configured to:

control the electric motor based on the second signal; and control the electric motor based on the first signal as a period in which the electric motor is controlled based on the second signal exceeding a first period.

9. An electric working machine comprising:

an electric unit;

a control device configured to control the electric unit;

an operation member configured to be operated by a user and configured to be movable to a first position;

a first switch configured to be operated by the operation member while the operation member moves to the first position; and a second switch configured to be operated by the operation member while the operation member moves to the first position, wherein the operation member passes a second position and a third position while the operation member moves to the first position, the first switch is configured to transmit a first signal which changes as the operation member moves from the second position to the first position to the control device when the operation member moves between the second position and the first position, the second switch is configured to transmit a second signal to the control device when the operation member moves toward the first position and passes the third position, the control device is configured to control the electric unit based on the first signal and the second signal, the operation member comprises a first portion and a second portion, the first portion is configured to operate the first switch as the operation member moves between the second position and the first position, and the second portion is configured to operate the second switch as the operation member moves toward the first position and passes the third position.

* * * * *